US007078877B2

(12) United States Patent  
Salasoo et al.

(10) Patent No.: US 7,078,877 B2
(45) Date of Patent: Jul. 18, 2006

(54) VEHICLE ENERGY STORAGE SYSTEM CONTROL METHODS AND METHOD FOR DETERMINING BATTERY CYCLE LIFE PROJECTION FOR HEAVY DUTY HYBRID VEHICLE APPLICATIONS

(75) Inventors: Lembit Salasoo, Schenectady, NY (US); Robert Dean King, Schenectady, NY (US); Ajith Kuttannair Kumar, Erie, PA (US); Dongwoo Song, Latham, NY (US); Henry Todd Young, Northeast, PA (US); Timothy Gerard Richter, Wynantskill, NY (US); Prahlad Bhugra, Bangalore, IN (US)

(73) Assignee: General Electric Company, Niskayuna, NY (US)

( * ) Notice: Subject to any disclaimer, the term of this patent is extended or adjusted under 35 U.S.C. 154(b) by 232 days.

(21) Appl. No.: 10/604,800

(22) Filed: Aug. 18, 2003

(65) Prior Publication Data

US 2005/0040789 A1    Feb. 24, 2005

(51) Int. Cl.
*H02J 7/00* (2006.01)
(52) U.S. Cl. .................................... 320/104
(58) Field of Classification Search ............ 320/104, 320/103, 116, 144; 307/149, 9.1, 10.1, 48, 307/66; 290/7, 9, 14, 16; 180/54.1, 60, 180/65.1, 65.2, 65.3, 68.1
See application file for complete search history.

(56) References Cited

U.S. PATENT DOCUMENTS

| | | | | |
|---|---|---|---|---|
| 4,958,127 A | * | 9/1990 | Williams et al. ............ 324/426 |
| 5,345,154 A | | 9/1994 | King ......................... 318/49 |
| 5,394,089 A | * | 2/1995 | Clegg ........................ 324/427 |
| 5,619,417 A | * | 4/1997 | Kendall ...................... 702/63 |
| 5,659,240 A | * | 8/1997 | King ......................... 320/134 |
| 5,698,971 A | | 12/1997 | Sahai et al. ................. 323/282 |
| 5,869,950 A | * | 2/1999 | Hoffman et al. ............ 320/103 |
| 5,905,360 A | * | 5/1999 | Ukita ......................... 320/118 |
| 5,998,960 A | * | 12/1999 | Yamada et al. ............. 320/104 |
| 6,087,808 A | | 7/2000 | Pritchard .................... 320/132 |
| 6,158,541 A | * | 12/2000 | Tabata et al. ................ 180/165 |
| 6,191,556 B1 | | 2/2001 | Galbraith et al. ............ 320/132 |
| 6,239,579 B1 | * | 5/2001 | Dunn et al. ................. 320/121 |
| 6,281,598 B1 | | 8/2001 | King et al. .................. 307/10.1 |
| 6,317,697 B1 | | 11/2001 | Yoshikawa et al. .......... 702/63 |
| 6,615,118 B1 | * | 9/2003 | Kumar ........................ 701/19 |

(Continued)

FOREIGN PATENT DOCUMENTS

EP      1245431 A2     2/2002

*Primary Examiner*—Adolf Deneke Berhane
*Assistant Examiner*—Aaron Piggush
(74) *Attorney, Agent, or Firm*—Fletcher Yoder

(57) ABSTRACT

A method for equalizing a storage parameter for a vehicle energy storage system having one or more energy storage banks associated therewith includes identifying a quiescent period of operation for the vehicle, and determining whether the value of a defined storage quantity for a first energy storage bank differs from the value of the defined storage quantity for a second energy storage bank by a threshold amount. During the quiescent period of operation, one of the first and second energy storage banks is discharged and the other of the first and second energy storage banks is charged. The one of the first and second energy storage banks corresponds to the bank having the value of the defined storage quantity exceeding the value of the defined storage quantity of the other of the first and second energy storage banks.

15 Claims, 12 Drawing Sheets

U.S. PATENT DOCUMENTS

| | | | |
|---|---|---|---|
| 2001/0001532 A1 | 5/2001 | Galbraith et al. | 320/132 |
| 2001/0034541 A1 | 10/2001 | Lyden | 607/29 |
| 2002/0161537 A1 | 10/2002 | Odaohhara | 702/63 |
| 2002/0177929 A1 | 11/2002 | Kumar | 701/19 |
| 2003/0034779 A1 | 2/2003 | Juncker et al. | 324/426 |
| 2003/0129459 A1* | 7/2003 | Ovshinsky et al. | 429/9 |
| 2003/0184307 A1* | 10/2003 | Kozlowski et al. | 324/427 |
| 2004/0090195 A1* | 5/2004 | Motsenbocker | 318/109 |

* cited by examiner

VEHICLE ENERGY STORAGE SYSTEM CONTROL METHODS AND METHOD FOR DETERMINING BATTERY CYCLE LIFE PROJECTION FOR HEAVY DUTY HYBRID VEHICLE APPLICATIONS

BACKGROUND OF THE INVENTION

The present disclosure relates generally to vehicle energy storage systems and, more particularly, to vehicle storage system control methods and a method for characterizing traction battery energy and power performance and project remaining service cycle life for heavy-duty hybrid electric vehicle applications.

In electric vehicles and hybrid electric vehicles (e.g., locomotives, off-highway mining vehicles, buses and automobiles), it is necessary to control the operation of the energy storage system in order to obtain high mission performance in terms of average mission speed, range, and/or payload capability, as well as to maximize the operating life of the energy storage system (ESS) and to avoid prematurely degrading thereof. For hybrid vehicles, it is also desirable to maximize the benefits of fuel and/or emissions savings. Existing energy storage systems in such vehicles may include one or more types of batteries, ultra-capacitors and/or flywheel systems.

ESS power command has traditionally been determined based on current drive power requirements, the ESS state of charge (SOC) or stored energy, and static ESS terminal power limits. The power sharing between individual banks in an ESS has further been based on the bank's SOC or stored energy, usable or rated energy capacity, and/or power limits. However, as between one or more individual energy storage banks, there may be a variation in the SOC that, utilizing conventional ESS power commands, could result in premature degradation of the ESS. Thus, it is desirable to be able to obtain greater life/less degradation of the energy storage system.

The performance characteristics for batteries used in electric vehicles and hybrid electric vehicles are normally specified by the manufacturer based on the specific energy (Wh/kg) thereof, volumetric energy density (Wh/l) thereof, and specific power (W/kg) thereof. In particular, the specific power characteristic is based on a "matched impedance" technique, wherein maximum power is transferred from the battery to the load (i.e., half of the power is dissipated in the load, while half of the power is dissipated in the battery's internal resistance). While this approach is useful in comparing one battery to another battery, it is generally not a good indication of the performance in an electric vehicle or hybrid electric vehicle, since the voltage where maximum power is transferred is 50% of the open circuit voltage.

Moreover, the energy rating of the battery is typically the total energy stored in the battery, not the useable energy. In an electric vehicle application, the lower limit for the SOC is typically somewhere around 20% of the total charge, or stated another way, around 80% of the Depth of Discharge (DOD) of the battery. Thus in the electric vehicle application, the useable energy is typically around 80% of the battery's total energy. Accordingly, the battery cycle life for an electric vehicle battery is often reported to be a number of 0–80% DOD cycles, after which point the available battery energy is reduced by 20% from the battery's original energy rating. Accordingly, at the battery's end of life, the electric vehicle will experience a 20% decrease in range.

In contrast, batteries for hybrid vehicle applications are typically operated over a significantly smaller range of DOD's as compared with an electric vehicle. As such, the useable energy of the hybrid vehicle battery is significantly lower than 80% of the battery's energy rating (as is the case for an electric vehicle). However, in the hybrid electric vehicle application, power is of particular concern, and therefore the battery's performance and life cycle should address both the discharge as well as the charge power levels. During vehicle deceleration or while holding speed on a down hill grade, the battery is expected to absorb high power levels. This condition is often referred to as regenerative braking. In small hybrid electric vehicles (e.g., passenger cars and vans), the regenerative braking interval is usually on the order of a few seconds; however, for heavy duty hybrid electric vehicle applications, the regenerative braking periods are on the order of 10s to 100s of seconds in duration or longer. As such, an improved method of battery characterization and determining battery life projection is also desirable.

BRIEF DESCRIPTION OF THE INVENTION

The above discussed and other drawbacks and deficiencies of the prior art are overcome or alleviated by a method for equalizing a storage parameter for a vehicle energy storage system having one or more energy storage banks associated therewith. In an exemplary embodiment, the method includes identifying a quiescent period of operation for the vehicle, and determining whether the value of a defined storage quantity for a first energy storage bank differs from the value of said defined storage quantity for a second energy storage bank by a threshold amount. During the quiescent period of operation, one of said first and second energy storage banks is discharged and the other of the first and second energy storage banks is charged. The one of the first and second energy storage banks corresponds to the bank having the value of the defined storage quantity exceeding the value of the defined storage quantity of the other of said first and second energy storage banks.

In another aspect, a method for resetting a state of charge (SOC) calculation for a designated energy storage bank of an energy storage system of a vehicle includes, during operation of the vehicle, completely discharging and completely charging the designated energy storage bank. The designated energy storage bank is maintained at a predetermined high terminal voltage for a specified period of time. Following the specified period of time, a calculated, reset SOC for the designated energy storage bank is defined to be a known SOC capacity.

In another aspect, a method for generating an energy storage control parameter for a vehicle energy storage system includes determining energy storage heat generation information and determining energy storage coolant flow information, and estimating, from the energy storage heat generation information and the energy storage coolant flow information, a storage bank temperature.

In another aspect, a method for generating an energy storage control parameter for a vehicle energy storage system includes receiving energy storage electrical property information, and estimating, from the energy storage electrical property information, a storage bank temperature.

In another aspect, a method for controlling a dynamic discharge rate for one or more energy storage banks in a vehicle energy storage system includes determining a charging/discharging rate of each energy storage bank within the energy storage system. A calculated capacity value for each said energy storage bank is adjusted based upon the determined charging/discharging rate, so as to produce a modified capacity. The modified capacity for each said energy storage bank is used in one or more energy storage system control algorithms.

In another aspect, a method for controlling the operating range of one or more energy storage banks in a vehicle energy storage system includes determining a point at which the energy storage bank has reached a threshold value with respect to an end of life (EOL) condition. Responsive to said threshold value, at least one of an energy storage bank operating parameter and an energy storage bank operating range is reduced.

In another aspect, a method for controlling one or more energy storage banks in a vehicle energy storage system includes determining a remaining life cycle for each of the energy storage banks. A total amount of commanded charging and discharging power commanded is allocated among each of the energy storage banks in accordance with the determined remaining life cycle thereof.

In another aspect, a method for characterizing and projecting remaining cycle life for vehicle storage battery includes performing a series of initial battery characterization tests and performing a series of periodic battery tests during the operating life of the vehicle storage battery. The results of the periodic battery tests are compared with the initial battery characterization tests, and a remaining cycle life is projected for the vehicle storage battery.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a method and system for extending the life and performance of hybrid and electric vehicle energy storage systems (ESS) by utilizing (among other aspects) customized energy charging, discharging and redistribution techniques that depend upon, among other aspects: state of charge (SOC) reset calculations, thermal models of the ESS, variations in energy storage technology within an ESS, energy storage end-of-life status, and variations in life cycle between individual storage banks.

Figure 1:
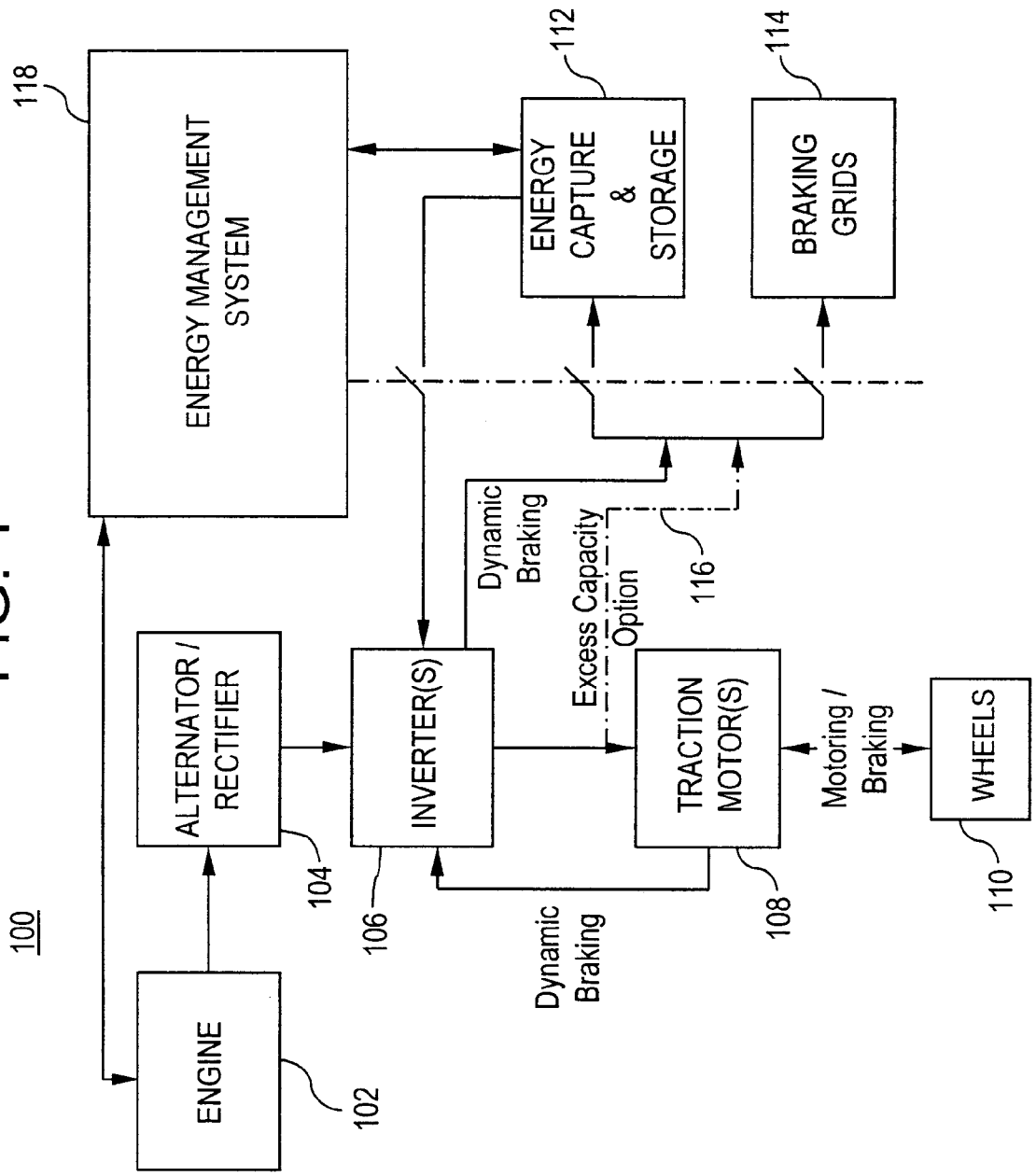
FIG. 1 is a system-level block diagram of an exemplary energy generation and storage system for hybrid OHVs, suitable for use in accordance with an embodiment of the invention.

Referring initially to FIG. 1, there is shown a system-level block diagram of an exemplary energy generation and storage system 100 for hybrid locomotives or off-highway (OHV) vehicles (or any electric drive vehicle with an associated storage medium), suitable for use in accordance with an embodiment of the invention. Such OHVs may include, for example, large excavators, excavation dump trucks, and the like. By way of further example, such large excavation dump trucks may utilize motorized wheels such as the GEB23™ AC motorized wheel employing the GE150AC™ drive system (both of which are available from the assignee of the present invention).

As illustrated in FIG. 1, a diesel engine 102 drives a prime mover power source 104 (e.g., an alternator/rectifier combination). The prime mover power source 104 preferably supplies DC power to a power converter (e.g., an inverter) 106 that provides three-phase AC power to an AC traction motor 108. It should be understood, however, that the system 100 illustrated in FIG. 1 can be modified to operate with DC traction motors as well. In this regard, one skilled in the art will appreciate that the system 100 could be further simplified by eliminating inverters 106 or, alternatively, utilizing a DC generator and eliminating alternator/rectifier 104 and inverters 106.

In one possible embodiment, there is a plurality of traction motors (e.g., one per axle or wheel set), with each axle/wheel set being coupled to a plurality of vehicle wheels. In other words, each traction motor 108 may include a rotatable shaft coupled to the associated axle for providing tractive power to the wheels. Thus, each traction motor 108 provides the necessary motoring force to an associated one or more wheels 110 to cause the vehicle to move.

When the traction motors 108 are operated in a dynamic braking mode, at least a portion of the generated electrical power is routed to an energy storage medium 112. To the extent that the energy storage medium 112 is unable to receive and/or store all of the dynamic braking energy, the excess energy may be routed to braking grids 114 for dissipation as heat energy. In addition, during periods when the engine 102 is being operated such that it provides more energy than needed to drive traction motors 108, the excess capacity (also referred to as excess prime mover electric power) may be optionally stored in energy storage medium 112. Thus, the energy storage medium 112 can be charged at times other than when the traction motors 108 are operating in the dynamic braking mode. This "excess capacity" aspect of the system 100 is illustrated in FIG. 1 by a dashed line 116.

The energy storage medium 112 of FIG. 1 may include at least one of the following storage subsystems for storing the electrical energy generated during the dynamic braking mode: a battery subsystem, a flywheel subsystem, or an ultra-capacitor subsystem. However, other storage subsystems are also contemplated. In addition, these storage subsystems may be used separately or in combination. When used in combination, the storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can further be extended to combinations of other storage subsystems, such as a battery and ultra-capacitor in combination where the ultra-capacitor supplies the peak demand needs.

The system 100 additionally includes an energy management system 118 for controlling the storage and regeneration of energy. As illustrated, the energy management system 118 is configured to receive data from the energy storage medium 112 and engine 102 (and optionally from traction motors 108). Energy management system 118 may include therein a data processor (not shown), associated database (not shown) and, optionally, a position identification system (not shown) such as a global positioning satellite system receiver (GPS). Based upon such input data, the energy management system 118 also issues appropriate control commands to control the flow of energy to and from the energy storage medium 112, to the inverters 106 and to the braking grids 114.

Figure 2:
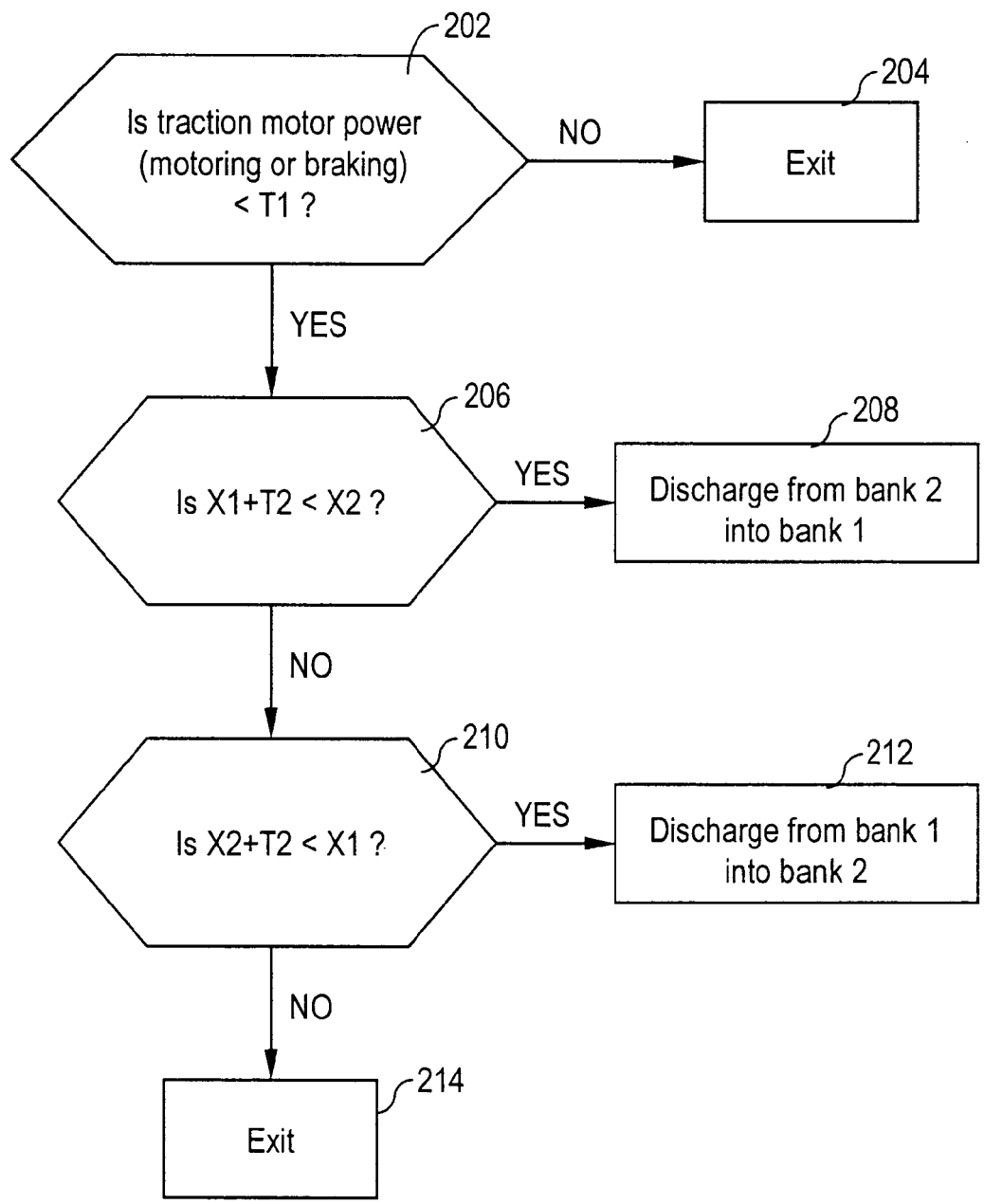
FIG. 2 is a flow diagram illustrating an exemplary method for equalizing charge between energy storage banks during quiescent operating periods, in accordance with an embodiment of the invention.

In accordance with a first aspect of the present invention, the system 100 is automatically recharged (by command of the energy management system 118) with energy from the engine during quiescent periods, so as to make more energy available for enhanced vehicle performance (e.g., speed) during subsequent periods of motoring and/or auxiliary power consumption. An exemplary flow diagram 200 illustrating this process is shown in FIG. 2, in which it is assumed that the energy storage medium 112 of FIG. 1 comprises at least first bank (bank 1) and a second bank (bank 2). As indicated in decision block 202, the energy management system 118 (also referred to hereinafter as the ESS controller) determines whether (either during motoring or braking) the traction motor power is below a defined low power operation value (T1). In other words, the ESS controller searches for a quiescent operating period. If the traction motor power is not below T1, then no further action is taken at that point, as shown at block 204.

If, however, a quiescent point is determined, the ESS controller proceeds to decision block 206, at which it is determined whether a defined storage quantity for bank 1 (X1) is less than the storage quantity for bank 2 (X2) by a defined threshold difference (T2). The compared storage quantity may be, for example: stored energy (kilowatt-hours), so as to ensure each bank has the same amount of energy available to deliver; relative stored energy (stored energy/rated energy), so as to ensure each bank has same amount of relative amount of energy to deliver and the same relative capacity available to accept more energy; stored energy minus rating (kilowatt-hours), so as to ensure each bank has the same available capacity to accept energy; stored charge (ampere-hours), so as to ensure each bank has the same amount of charge available to deliver; relative stored charge (stored charge/rated stored charge), so as to ensure each bank has the same relative amount of charge to deliver and the same relative capacity available to accept more charge; and stored charge minus rating (ampere-hours), so as to ensure each bank has the same available capacity to accept charge.

Regardless of the specific compared storage quantity, if X1 is less than X2 by at least the threshold difference T2, then the ESS controller will cause a discharge from bank 2 into bank 1, as shown in block 208. If this is not the case, then the ESS controller will check for the reverse condition at block 210 (i.e., whether X2 is less than X1 by at least T2). If so, the ESS controller discharges from bank 1 into bank 2, as shown at block 212. If the compared quantity differential in either case is not greater than T2, then no action is taken, even in quiescent periods, as shown at block 214.

In accordance with a further embodiment of the present invention, the ESS controller is also configured to carry out equalization not only during these quiescent periods, but also during active operation such as in motoring or dynamic braking. Similar to quiescent periods of operation, the ESS controller specifies where discharging energy is directed during active operation. Preferably, energy to be discharged is stored in other energy banks or applied to motoring so as to prevent waste. Since motoring power usage is highly variable and not directly controlled by the energy storage controller, introducing other energy storage banks as an energy sink means allows the discharging to be done in a more controlled manner. A least preferred option is to dissipate the discharging energy through the grid resistors, which is wasteful. In addition to directing discharging energy, the ESS controller also specifies where charging energy is obtained. Again, a preferred option is to draw charging energy from other available energy storage bank(s) since this avoids disturbing the engine operation, and yields a better controlled power flow than from using regenerative braking energy (which comes in unpredictable bursts).

Existing ESS control methods typically rely primarily on the state of charge thereof, a parameter that is generally difficult to determine. The state of charge (SOC) is conventionally determined by integrating the current flow into and out of the energy storage bank. However, errors may often accumulate from measurement and/or calculation imperfections, from controller stored data loss during unanticipated events such as power interruptions, memory or disk failures, card replacement or maintenance procedures.

Thus, another embodiment of the present invention is the determination of when to perform the equalization. In one embodiment, a standard equalization cycle is utilized during quiescent operation of the vehicle, while during motoring periods of operation, charging power is taken from engine or from other available ESS energy storage banks. The discharging power, as stated above, is utilized for motoring, sent to other ESS energy storage banks, or possibly to the braking resistors. Alternatively, however, the equalization cycle may be carried out at a predetermined interval of elapsed time, elapsed ESS operational hours or ESS energy or charge throughput. In still another variation to conserve energy, the normal energy management strategy may be replaced by one repetition of the same type of discharge-to-empty/charge-to-full cycle during the vehicle operating cycle, with charging energy drawn chiefly from the dynamic braking, and discharging energy sent chiefly to motoring. When there are more than one energy storage banks included in the energy storage system, the total ESS power flow resulting from the vehicle mission may be allocated between the storage bank to be equalized and the balance of the ESS, thereby performing the equalization of the storage bank in question.

As stated previously, the ESS state of charge is fairly difficult to determine for batteries. Accordingly, the SOC calculation may be reset so as to recover a more accurate battery state. In a conventional SOC calculation procedure, the battery is discharged to a fully discharged condition, and thereafter charged to a fully charged condition and maintained at a predetermined high terminal voltage for a specified time while charging continues at a low current level. At this point, the battery is defined to be completely charged and the SOC measurement is typically set to the known SOC capacity at this point. However, such an SOC calculation reset has heretofore been limited to circumstances where the OHV is not in operation (e.g., as during maintenance periods or when parked/garaged).

Figure 3:
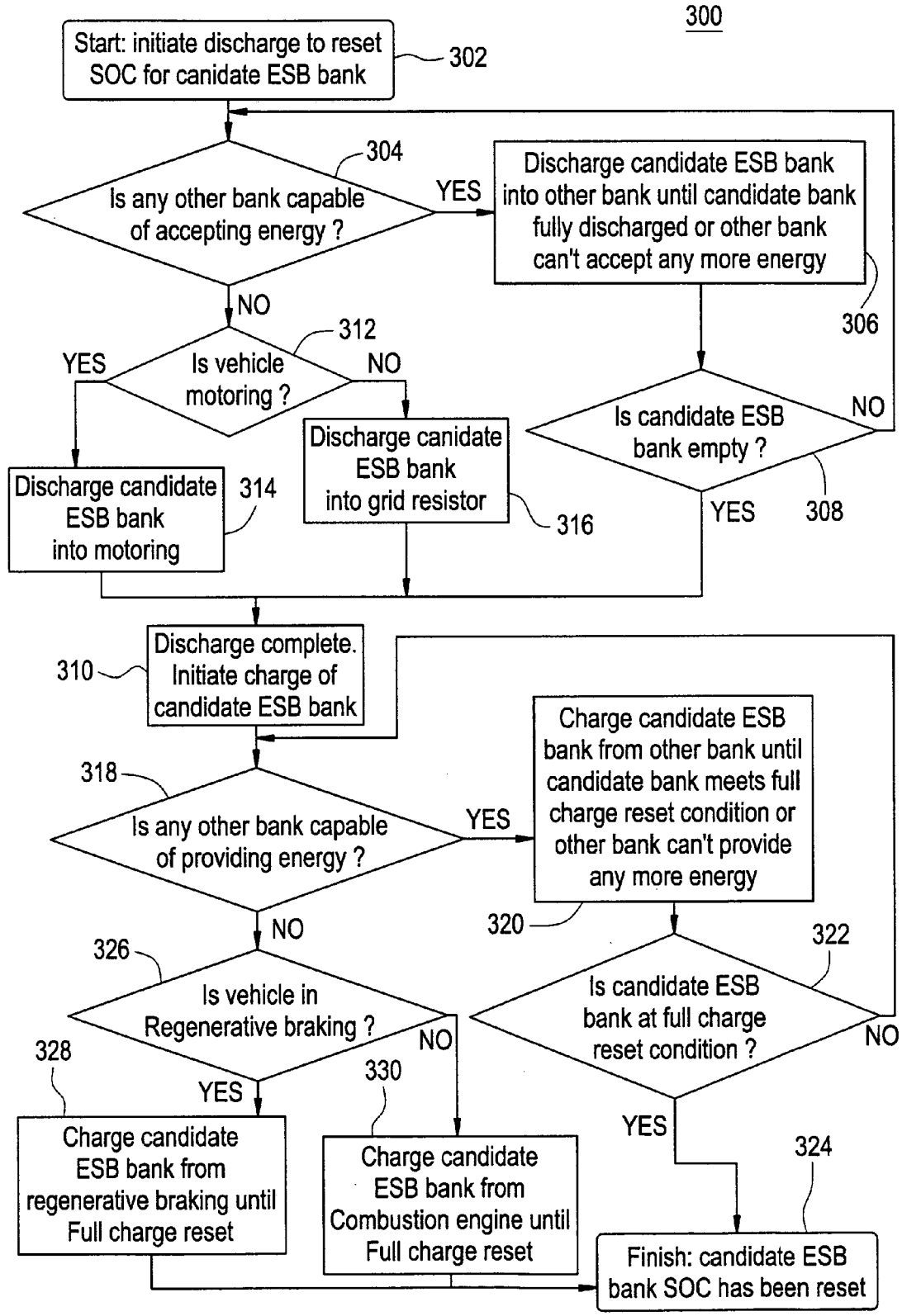
FIG. 3 is a flow diagram illustrating an exemplary method for resetting a state of charge (SOC) calculation for one or more energy storage banks of an energy storage system of a vehicle, in accordance with an embodiment of the invention.

Accordingly, FIG. 3 is a flow diagram illustrating an exemplary method 300 for resetting a state of charge (SOC) calculation for one or more energy storage banks of an energy storage system of a vehicle during actual operation of the vehicle, in accordance with a further embodiment of the invention. Method 300 begins at start block 302, wherein an energy storage bank (e.g., a battery bank) designated for SOC reset is to be discharged. As shown in decision block 304, method 300 will first determine whether there is another energy bank available to accept the energy discharged from the designated bank. If so, method 300 proceeds to block 306 where the designated bank is discharged to the available bank until the designated bank is either fully discharged or the available bank is no longer able to accept any further energy. Thus, if at decision block 308, the designated energy storage bank is still not discharged, method 300 will return back to decision block 304 to see whether there are any other banks available to accept the remaining energy not discharged from the designated bank. However, if the designated has been discharged completely to the available bank, then method 300 will proceed to block 310, as described hereinafter.

In the event that no other banks are available to completely discharge the designated energy storage bank (or there were none to begin with), then method 300 will proceed to decision block 312 to see whether the vehicle is in a motoring mode of operation. In other words, if the remaining energy to be discharged from the designated energy storage bank cannot be stored elsewhere, then the next preferred option is to apply the energy to motoring. Accordingly, if the vehicle is motoring during the SOC reset discharging function, method 300 will apply this energy to motoring, as shown in block 314. If the vehicle is not motoring, then the least preferred option is to dissipate (i.e., lose) the energy through the grid resistors, as shown in block 316. It should be appreciated that if some discharge energy were to be applied to motoring, but the vehicle were no longer motoring before the energy was completely discharged, then the remaining energy could then be dissipated through the grid.

Regardless of how the designated storage bank energy is discharged, the discharging operation will eventually be completed, as reflected at block 310. In accordance with SOC reset calculation methodology, the designated energy storage bank is then completely recharged. The remainder of method 300 designates from what source this charging energy is taken. Continuing on to decision block 318, it is determined whether any other energy storage bank is capable of supplying the charging energy. If another bank is capable of providing energy, the method 300 proceeds to block 320. At this point, the designated energy storage bank will be charged from the available bank until the designated battery bank meets a full charge reset condition or until the available bank can no longer provide energy. It should be understood that a "full charge reset condition" is satisfied when the energy storage bank calculated SOC is at the rated value, and the battery terminal voltage has been held to a specified high voltage level for a specified time. Once at the full charge reset condition, the SOC calculation for the designated energy storage bank is reset, as shown at block 324.

However, if at decision block 322 the designated energy storage bank is not at a full charge reset condition, then method 300 returns to block 318 to see whether any other banks are available to complete the recharge. If there are no other available banks (or none to begin with), then method 300 proceeds to decision block 326 and determine whether the vehicle is in a regenerative (dynamic) braking mode. In other words, if the remaining charging energy to be applied to the designated energy storage bank cannot be taken from another bank elsewhere, then the next preferred option is to obtain the energy from dynamic braking. Accordingly, if the vehicle is in dynamic braking during the SOC reset charging function, method 300 will draw this energy from dynamic braking, as shown in block 328. If the vehicle is not in dynamic braking, then the least preferred option is to obtain the energy from the vehicle's combustible engine, as shown in block 330. It should be appreciated that if some of the charging energy were to be obtained from dynamic braking, but the vehicle were no longer in dynamic braking before the designated energy storage bank was completely charged, then the remaining charging energy could then be obtained from the engine.

As will be appreciated, the performance characteristics and optimal settings of control parameters for energy storage technologies such as batteries and ultracapacitors vary with temperature. To obtain a high level of ESS performance, then, the applicable control algorithm parameters should be adjusted based upon the present temperatures of cells or groups of cells in the battery and/or ultracapacitor banks. Unfortunately, the actual implementation of temperature sensing devices at the desired locations can be expensive and, in certain instances, impractical.

Therefore, in accordance with a further aspect of the present invention, the ESS controller (in order to reduce the number of temperature measurement points) utilizes models of storage cell temperature, based on factors such as ambient temperature, ambient pressure, ventilation blower conditions, battery/ultracapacitor bank current and/or current history, battery/ultracapacitor technology and/or chemistry, and battery box packaging characteristics. The estimated temperatures from the thermal model are used to adjust the appropriate ESS control parameters.

In addition to energy storage heat generation information and energy storage bank coolant flow information, the estimator 400 may optionally receive additional input information such as battery cell/module/assembly thermal resistance and/or heat capacity information 408, as well as one or more actual temperature measurements 410 taken from those locations in the energy storage system that might be physically accessible (e.g., ambient temperature, air temperature inside the battery box).

In addition to energy storage heat generation information and energy storage bank coolant flow information, the estimator 400 may optionally receive additional input information such as battery cell/module/assembly thermal resistance and/or heat capacity information 408, as well as one or more actual temperature measurements taken from those locations in the energy storage system that might be physically accessible (e.g., ambient temperature, air temperature inside the battery box).

The estimated variables and any measured inputs are then used by the estimator 400 in the computation of an estimated storage bank temperature 412 that is in turn used in an energy storage control parameter adjustment 414 by the ESS controller. For example, an energy storage control parameter adjustment could be the adjustment of a maximum charging voltage, based upon the estimated storage bank temperature. Essentially, the estimated storage bank temperature is determined by comparing estimated heat generated within the storage bank with estimated coolant flow in the embodiment of FIG. 4.

Figure 4:
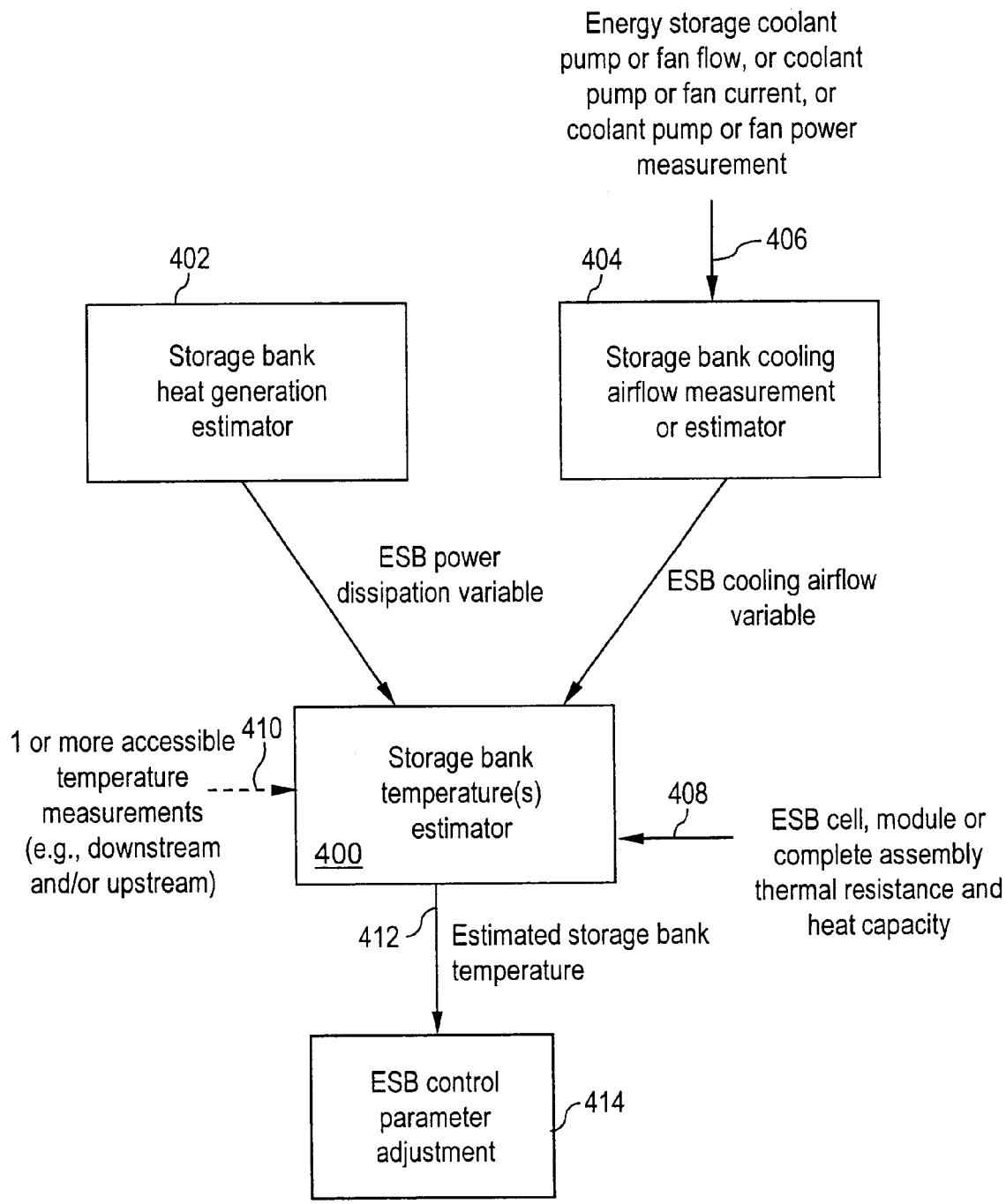
FIG. 4 is a block diagram illustrating a storage bank temperature estimation function implemented by the energy storage system controller, in accordance with a further aspect of the invention.
Figure 5:
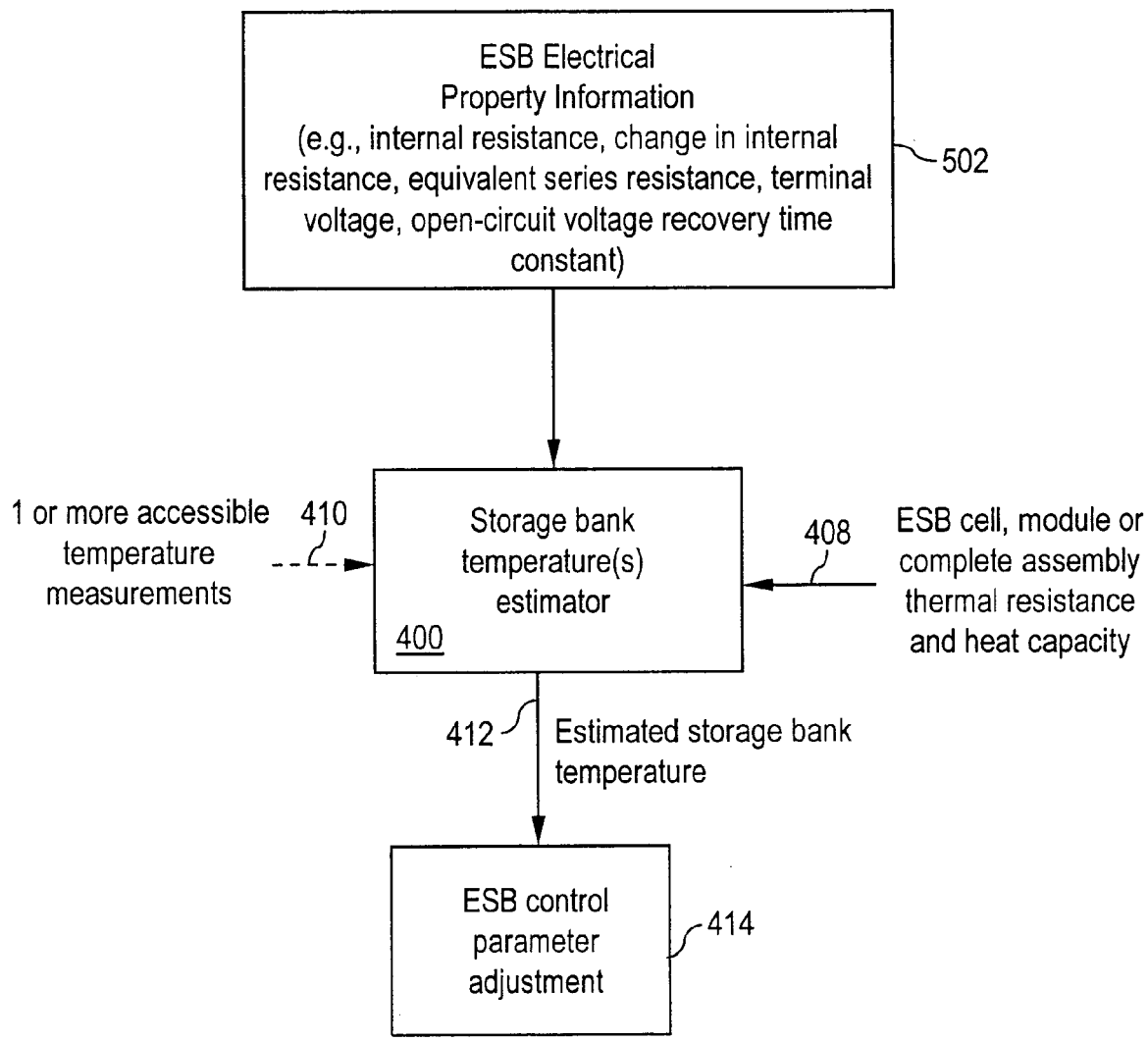
FIG. 5 is a block diagram illustrating an alternative embodiment of the storage bank temperature estimation function implemented in FIG. 4.

FIG. 5 is an alternative embodiment of FIG. 4 in which, instead of using energy storage heat generation information and energy storage coolant flow information, the estimator 400 utilizes energy storage electrical property information, as shown in block 502. This may include one or more of, for example, internal resistance, change in internal resistance, equivalent series resistance, terminal voltage, and open circuit recovery time constant.

In hybrid propulsion systems including different technologies within the energy storage system, the SOC of each specific energy storage technology is used as a key control parameter. Furthermore, in the control of an energy storage system using different storage technologies, the dynamic discharge rate is also considered in the overall system control, since the amount of energy that can be extracted is a function of several parameters, including the battery temperature and the dynamic discharge rate. Because the dependence on the dynamic discharge rate varies for each specific battery technology, this factor is included in the overall ESS control algorithm.

Figure 6:
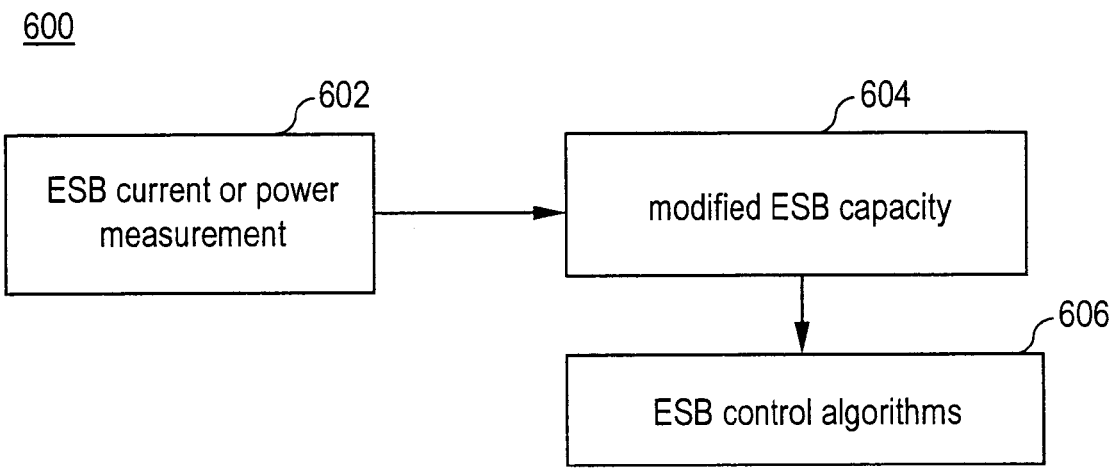
FIG. 6 is a block diagram illustrating a method of customizing dynamic rate of discharge for energy storage systems having different storage technologies therein, in accordance with a further aspect of the invention.
Figure 7:
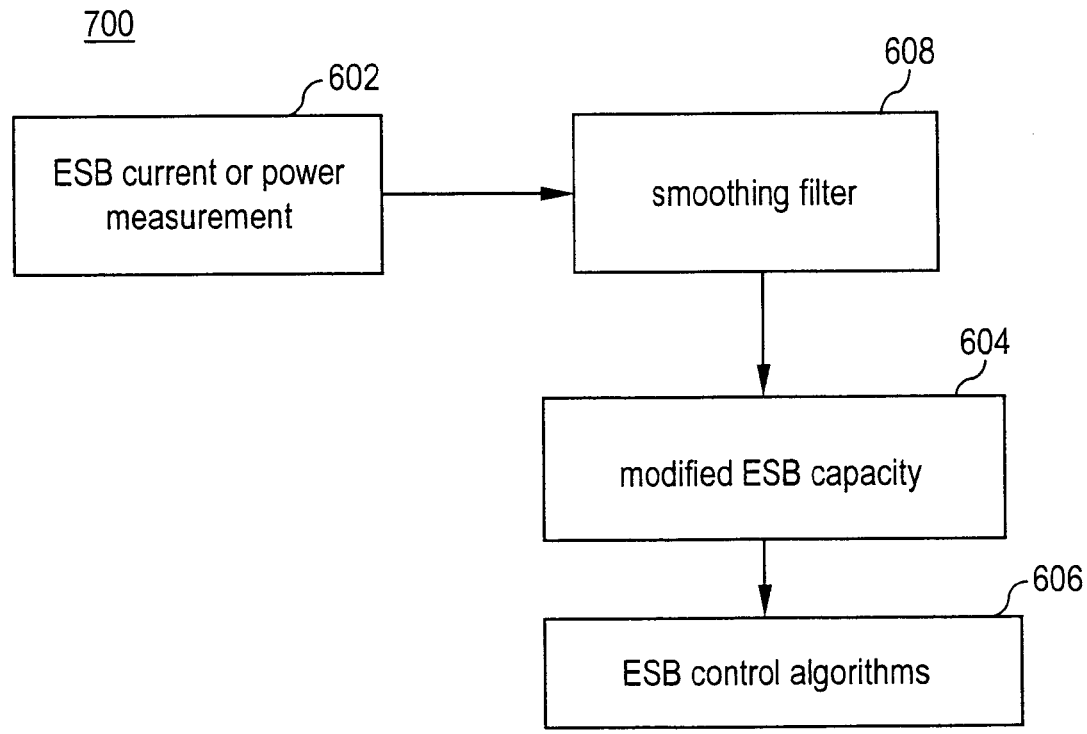
FIG. 7 is an alternative embodiment of the block diagram of FIG. 6.

As shown by the block diagram 600 of FIG. 6, the ESS controller also has the capability of customizing the dynamic discharge rate of various storage technologies within the system. Thus, for example, if a battery is charged/discharged at a very high rate (as determined by an appropriate current or power measurement at block 602), less charge or energy can be charged/discharged. Accordingly, a battery control strategy that relies on knowing the battery charge and/or energy capacity may be improved by modifying the calculated value of capacity based on the charging/discharging rate, as shown in block 604. This modified value of battery capacity is then used in the other battery control algorithms operated by the ESS controller, as reflected in block 606. However, in embodiments where the instantaneous charging/discharging rate is used as the measurement of block 602, then the resulting value of the modified battery capacity may vary to a greater extent and thus disturb the battery control unduly. As such, a filter 608 may be used to smooth the charging/discharging rate signal in order to stabilize the controller and battery operation. This is illustrated in the alternative block diagram 700 of FIG. 7.

The end of life (EOL) of an energy storage systems is determined when the system no longer meets its performance requirements. For example, the EOL of a particular storage system may be defined when the usable stored energy capacity falls to 80% of the nominal value, or when the effective series resistance of the system rises to an unacceptably high value. In any case, this loss of performance is due to incremental damage that an energy storage bank sustains during each operational cycle of the storage bank, such that as the energy storage ages, its performance progressively reduces. Moreover, when it is attempted to charge or discharge an energy storage system with more energy than its capacity at that time, the loss of life is much accelerated. Accordingly, when an energy storage system is close to the end of its life and its operating cycle occasionally covers a high swing in the stored energy, it is more and more likely to be operated outside its now-reduced capacity range, with much higher likelihood of accelerated loss of the remaining life.

Thus, in accordance with a further aspect of the present invention, the ESS controller implements reductions in one or more energy storage operating parameters or parameter ranges based upon total accumulated usage. By way of example, such reduced energy storage operating parameters or parameter ranges may include, but are not necessarily limited to: charging terminal voltage, maximum SOC or Ah limits, maximum current flow, maximum power flow, maximum stored energy, lower operating range between minimum and maximum SOC, lower operating range between minimum and maximum stored energy, and lower operating range between minimum and maximum terminal voltage.

The determination of EOL (or energy storage accumulated usage) can be based upon, for example: total amperehours charged or discharged, total kilowatt-hours charged or discharged, total operating hours in charge and/or discharge mode, elapsed time in operation, number of vehicle missions completed, vehicle distance traveled, vehicle total fuel consumed or energy supplied from engine, increases in calculated battery internal resistance or impedance, or reduction of charge or energy used to reset the SOC calculation of the battery. In this manner, the accelerated loss of remaining cycle life due to overcharging or discharging is alleviated, and significantly higher total lifetime performance of the energy storage banks is realized.

Existing control methods for ESS systems having more than one energy storage bank may operate to allocate the power commanded from each individual bank based on the power rating, energy rating or SOC of the individual bank. However, this does not account for the possibility that the individual storage banks may have differently rated cycle lives or remaining cycle lives. In such a case, one bank may be operated with commanded parameters that exceed desired values so as to unnecessarily accelerate its end of life, when another bank is capable of handling an increased percentage of the overall burden. Therefore, in accordance with still a further aspect of the present invention, the ESS controller is also configured to apportion the total ESS power command based on an individual bank's rated and/or remaining cycle life.

Generally speaking, when either charging or discharging power is commanded from the energy storage system, the resulting power flow is preferentially satisfied from the higher rated and/or remaining cycle life energy storage bank. If the higher rated and/or remaining cycle life storage bank is not capable of satisfying the full power interchange command (due to terminal power limitations or low available energy storage capacity, for example), then the next highest remaining rated and/or remaining cycle life storage bank is committed to satisfy the hybrid system power demand. In this manner, the energy storage banks are each cycled according to its cycle life capability, with the higher cycle life storage banks cycling more than the lower cycle life storage banks. The desired result is that the operating period of the lower cycle life storage banks is extended, thereby extending the period before the hybrid energy storage system requires maintenance and/or replacement. Furthermore, the life higher cycle life storage bank is more fully utilized once the lower cycle life banks need to be replaced.

Figure 8:
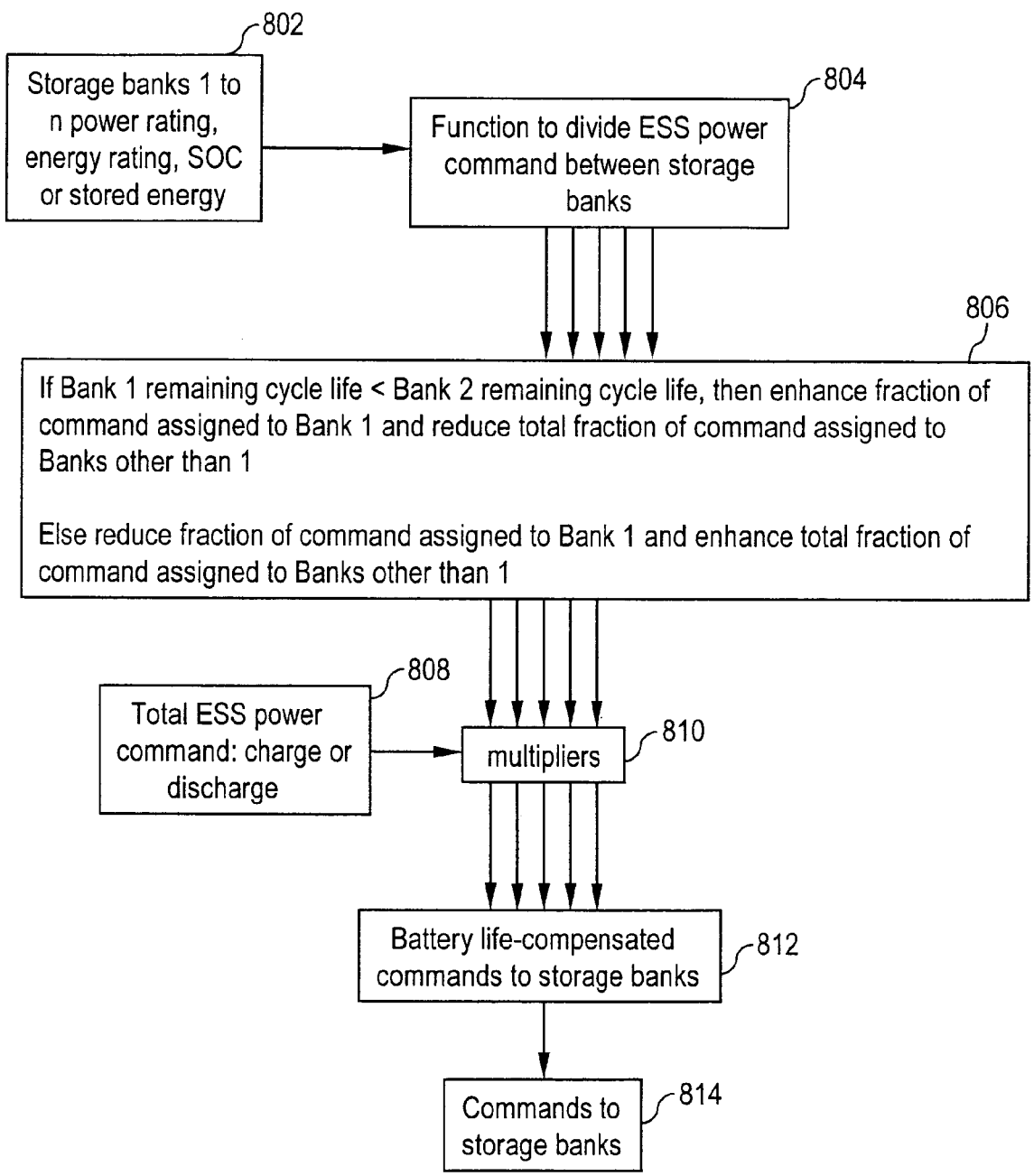
FIG. 8 is block diagram illustrating a method of apportioning a power command among storage banks having different remaining cycle lives, in accordance with another aspect of the present invention.

An alternative embodiment to this prioritizing scheme is to share, at the outset, the overall power demand in proportion to the rated and/or remaining cycle life values. This is illustrated by the block diagram 800 of FIG. 8. The ESS controller has access to the power rating, energy rating, calculated SOC and/or stored energy information for each of a plurality of individual storage banks, as shown in block 802. With this information, the ESS divides the total power command among storage banks using an initial participation factor (between 0 and 1) that represents what fraction of the power command each bank is responsible for. This is shown in block 804. For example if the ESS includes a total of five storage banks, and each bank has a substantially equal remaining cycle life, then the initial participation factor would be 0.2 for each bank.

However, either initially or after further usage of the system over time, the remaining cycle life as between each bank may vary. To address this issue, the ESS controller will periodically evaluate this condition and, when appropriate, adjust the participation factor of two or more storage banks. Block 806 illustrates an example of the decision logic applied to Bank 1 and Bank 2 in this regard. As a result, the participation factor for each energy storage bank is adjusted based on the remaining cycle life parameters. When a total ESS power command is generated by other aspects of the ESS controller (as shown in block 808), this command is combined with the adjusted participation factors at block 810 to generate battery life-compensated commands (block 812) that may be included among the overall commands issued to the individual banks (block 814).

As will be appreciated, a hybrid vehicle design allows for additional flexibility in ESS control techniques that have been traditionally based determined based on limited parameters such as traction drive and energy storage system current or power requirements. In particular, such techniques can be directed toward extending the life and performance of the energy storage system used in the hybrid vehicle. While the particular type of energy storage medium used in the above described control method embodiments is not limited to any one particular type of storage medium, there are still further advantages that may be obtained in such system when the energy storage system includes one or more energy storage batteries, specifically in regard to determining a battery life cycle projection thereof.

Battery Life Projection

A battery's performance is often characterized by a discharge curve, which is a curve depicting battery voltage as a function of time given a predetermined discharge rate (i.e., battery current draw). The discharge curve often drops dramatically at a discharge curve knee. Discharge curves vary with the internal resistance of the battery, the battery discharge rate, and temperature. As the discharge rate curve changes, so does the capacity and life of the battery. As a battery ages, its internal resistance generally increases. Thus, battery voltage output varies not only with temperature and discharge rate, but also with battery age.

Figure 9:
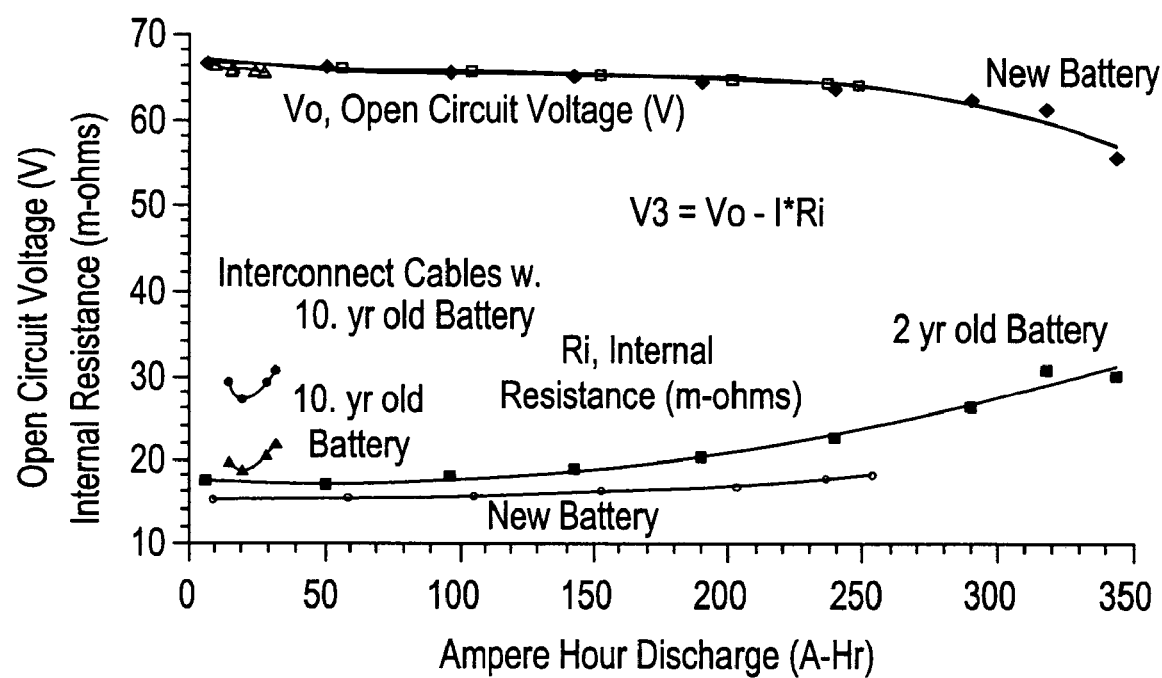
FIG. 9 illustrates a comparison of measured battery internal resistance and open circuit voltage versus depth of discharge (DOD) for similarly rated batteries having different calendar and cycle lives.

FIG. 9 illustrates a comparison of measured battery internal resistance and open circuit voltage versus DOD for similarly rated batteries having different calendar and cycle lives. As can be seen from the curves, the older the battery, the greater the internal resistance becomes both before and after a discharge event. Particularly, the greater the discharge, the faster the internal resistance rises (or the open circuit voltage drops) as the battery ages. It will be noted that non-battery cycle-life factors, including low water (for some battery technologies), high resistance battery-to-battery interface connections, or even high resistance in the battery power cables, may provide a false indication of battery degradation. It will further be noted in FIG. 9 that, for the 10-year-old battery, an increased cable resistance combines with the internal battery resistance, making it appear that the discharge capacity of the battery is less than actual.

Therefore, in accordance with a further aspect of the present invention, a method and technique for determining traction battery energy, power characterization and projection of remaining cycle life for heavy-duty (HD) hybrid electric vehicle (HEV) applications is disclosed. Briefly stated, the method includes an initial series of battery characterization tests, followed by tests of the traction battery during the operating life thereof, such as during vehicle's periodic service. The initial characterization tests include an initial commissioning charge and full capacity test (hereinafter referred to as "Test 1"), followed by a full recharge and partial discharge test (hereinafter referred to as "Test 2"), followed by a repetitive set of partial charge and partial discharge tests (hereinafter referred to as "Test 3"). By comparing the results of the periodic service tests to the initial characterization tests, a more accurate determination of the remaining cycle life is realized.

Figure 10:
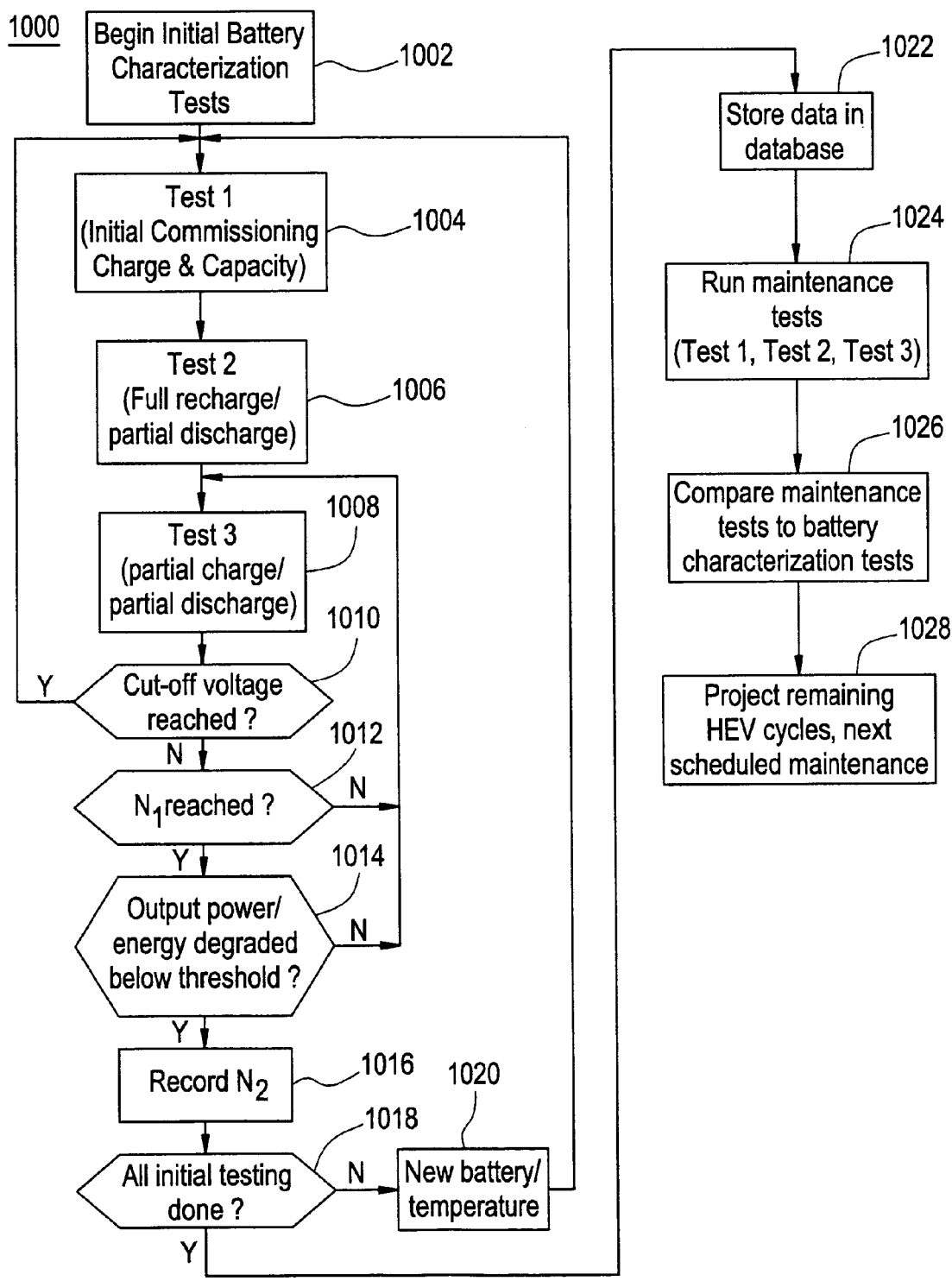
FIG. 10 is a flow diagram illustrating a method for determining traction battery energy, power characterization and projection of remaining cycle life for heavy-duty (HD) hybrid electric vehicle (HEV) applications, in accordance with another embodiment of the invention.

Referring now to FIG. 10, there is shown a flow diagram 1000 illustrating an embodiment of the above mentioned method. Beginning at block 1002, the initial series of battery characterization tests are performed. These tests may be performed on a representative sample of HD HEV batteries, or alternatively, upon each such battery to be used for a particular application. In either case, the results are stored in a suitable medium, such as a database for future performance comparison. Proceeding to block 1004, an initial commissioning charge and full capacity test (Test 1) is performed, during which the battery power and energy capability is measured over the cycle life thereof. Preferably, these initial characterization tests using are performed on a statistically significant number of battery modules, as well as being implemented at two or more different operating temperatures.

For the flooded Ni—Cd battery technology, the battery water level is preferably observed within a few minutes after completion of the commissioning charge, in accordance with the manufacturer's recommendation. If the water level is below the minimum level marked on the battery case, then water should be added, within a prescribed 1 hour time period.

After completion of Test 1 (and following battery module watering, if required), method 1000 proceeds to block 1006, wherein a full charge/partial discharge test (Test 2) is then implemented, as described in greater detail later. Method 1000 then proceeds to block 1008, wherein a series of partial charge and discharge tests (Test 3) are carried out. Such tests are representative of battery usage in heavy-duty, hybrid electric vehicle (HD HEV) applications. As explained in further detail hereinafter, the individual iterations of Test 3 cycle the battery over 50% of its total capacity range. Eventually, these repeated tests will cause the internal resistance of the battery to increase and, correspondingly, the output terminal voltage to decrease.

Following each iteration of Test 3, method 1000 determines at decision block 1010 whether the partial charge/partial discharge process results in the battery output voltage dropping down to a first predetermined cut-off voltage ($V_1$) as a result of a high discharge current spike or a second, higher predetermined cut-off voltage ($V_2$) as a result of the final C rate discharge portion of the Test 3 profile (described in more detail later). If either of the two cut-off voltage points is reached, then Test 3 is aborted and a new commissioning charge and capacity test (i.e., Test 1) is performed. In other words, the battery characterization tests for that particular battery are started over again. Such a condition may occur, for example, due to a low water condition of a Ni—Cd battery.

So long as neither of the two cut-off low voltages are reached, method 1000 proceeds to decision block 1012 to see whether a first number ($N_1$) of Test 3 repetitions have been performed on a given battery, wherein $N_1$ is related to the vehicle specification for the number of HEV cycles recommended between a commissioning charge and a scheduled maintenance. Until $N_1$ has been reached, method 1000 will return to block 1008 for a subsequent iteration of Test 3. Once the number of iterations performed equals $N_1$, method 1000 will then proceed to decision block 1014. At this point, method 1000 is looking for a point at which (as a result of repeated partial discharge/partial charge cycles simulating HEV battery operation) the battery is unable to output a specified percentage of its rated power (% Rated Power) or its rated energy (% Rated Energy).

Accordingly, as long as the output power/energy has not degraded below the designated percentage (e.g., 70%), the method will continue to return to block 1008 for additional Test 3 cycles. Eventually, however, an increased battery internal resistance (along with a reduction in the battery's power capability and useful stored energy) will result as the number of battery HEV charge/discharge cycles increase, assuming the battery is held at a constant temperature during this prescribed cycle life testing. Thus, once the output power/energy eventually degrades below the designated percentage, method 1000 proceeds to block 1016 where a second number ($N_2$) of Test 3 repetitions is recorded.

At this point, the initial characterization tests for a given battery at a given temperature are completed. As stated previously, it is desirable to perform such testing on a sufficient representative sample of batteries at least two different operating temperatures. As such, method 1000 next proceeds to decision block 1018 to see whether all of the initial characterization tests are completed. If not, then a new battery and/or operating temperature are selected at block 1020, and method 1000 returns back to block 1004 for a new set of characterization tests. Once the HEV battery characterization tests are finally completed on a representative set of batteries for at least two values of battery temperatures, the relevant data therefrom (e.g., computed battery internal resistance trend versus DOD, cycle life, temperature, and values of $N_1$, and $N_2$, etc.) are all stored in a database as shown in block 1022.

Periodically, such as during scheduled maintenance or inspection of a heavy-duty hybrid vehicle, Tests 1, 2, and 3 are applied to the traction battery installed in the vehicle. This is indicated in block 1024. Although Test 3 is not repeated to the extent as in the initial characterization tests, it is preferably repeated at least two times during maintenance testing. As shown in block 1026, the results of the maintenance tests are compared with the battery characterization results already stored in the database. In addition, the battery temperature may be recorded and used in a compensation algorithm for comparison purposes. If the HEV has a "self-test" capability, the traction battery tests could be performed autonomously. Otherwise, external charge/discharge equipment could be utilized to perform these in-vehicle tests. The average values of the computed battery internal resistance and measured power and energy performance are then also entered into the database.

Finally, at block 1028, the comparison of the trend of the computed parameters from the periodic in-vehicle tests to the initial characterization database allows for the projection of the number of HEV cycles remaining in the battery, as well as when the next maintenance period is recommended. This assists in providing a specified confidence level that the HEV battery will not fail prior to the next scheduled maintenance period.

Figure 11A:
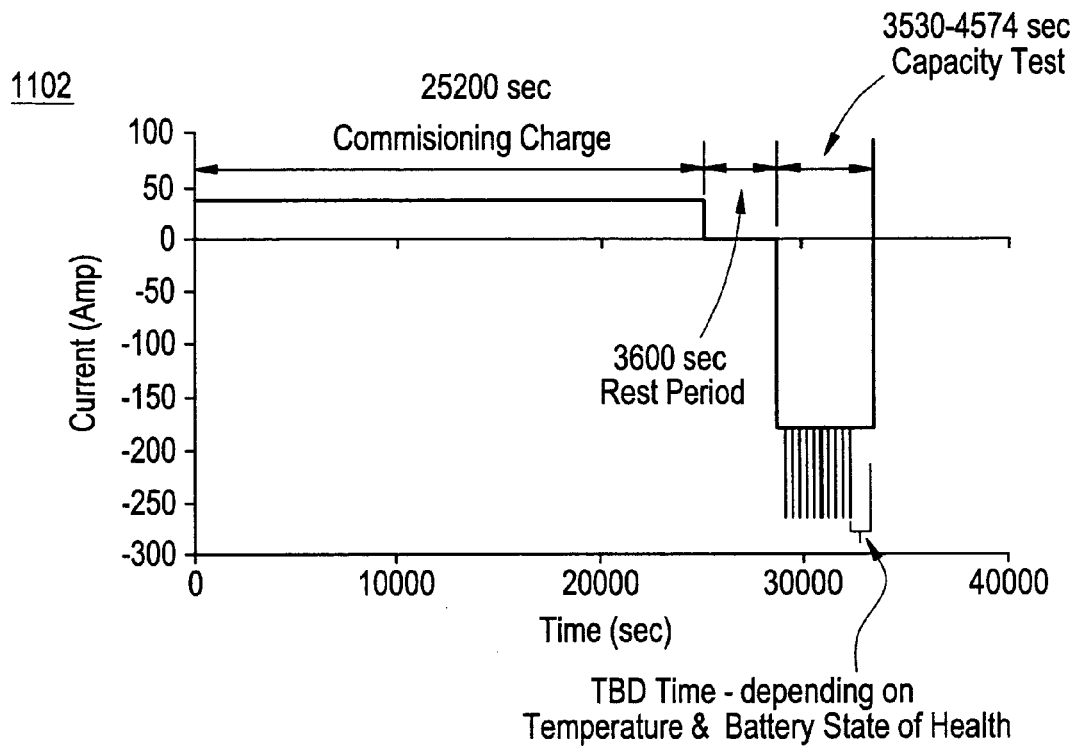
FIGS. 11–13 illustrate in greater detail exemplary initial battery characterization test methodologies outlined in FIG. 10 on a battery having a capacity of 180 Ah.
Figure 11B:
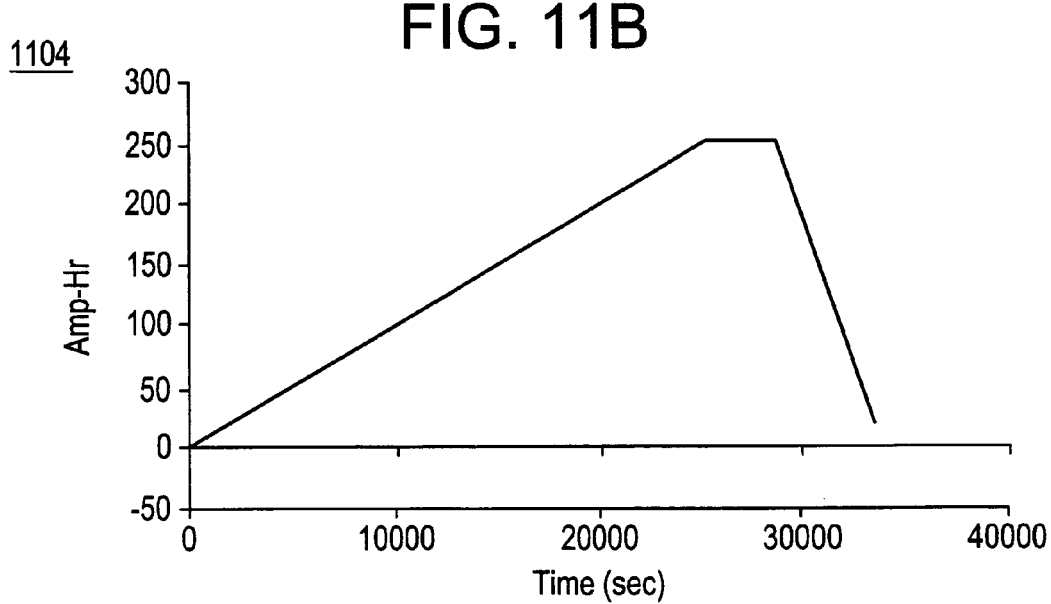
Figure 12A:
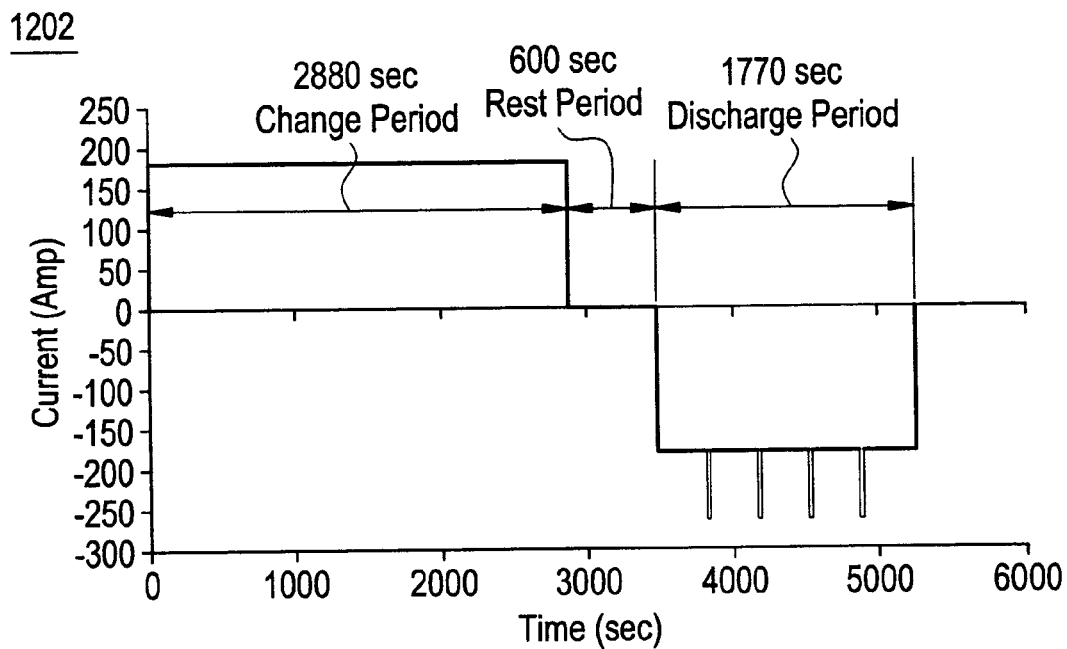
Figure 12B:
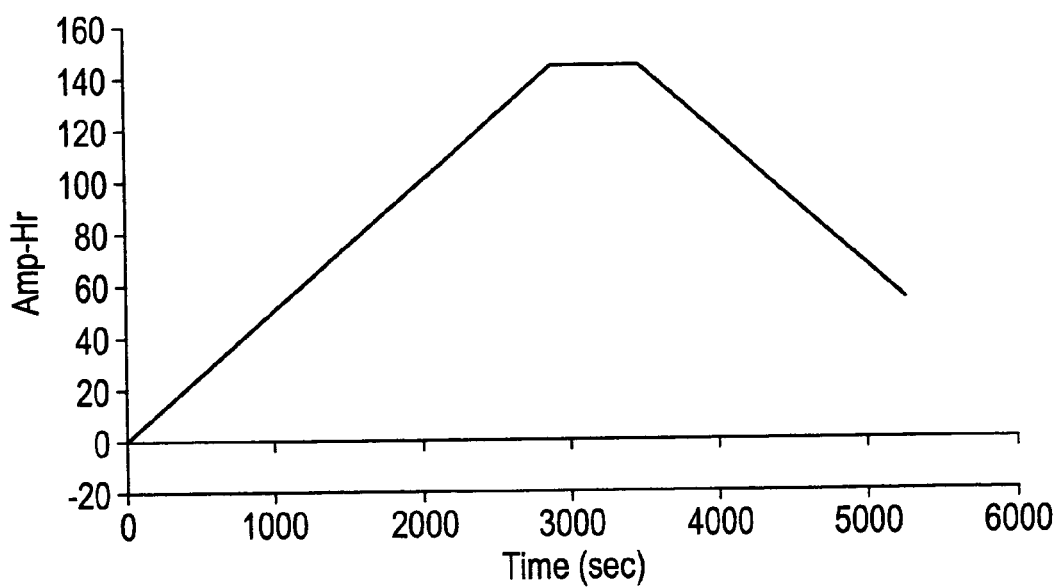
Figure 13A:
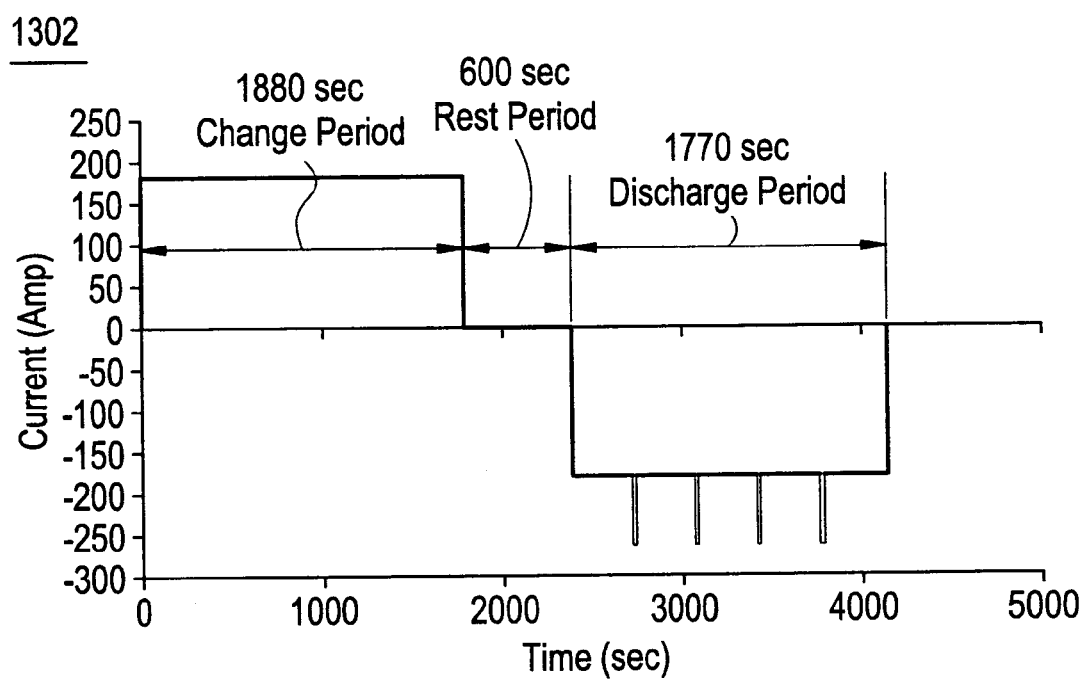
Figure 13B:
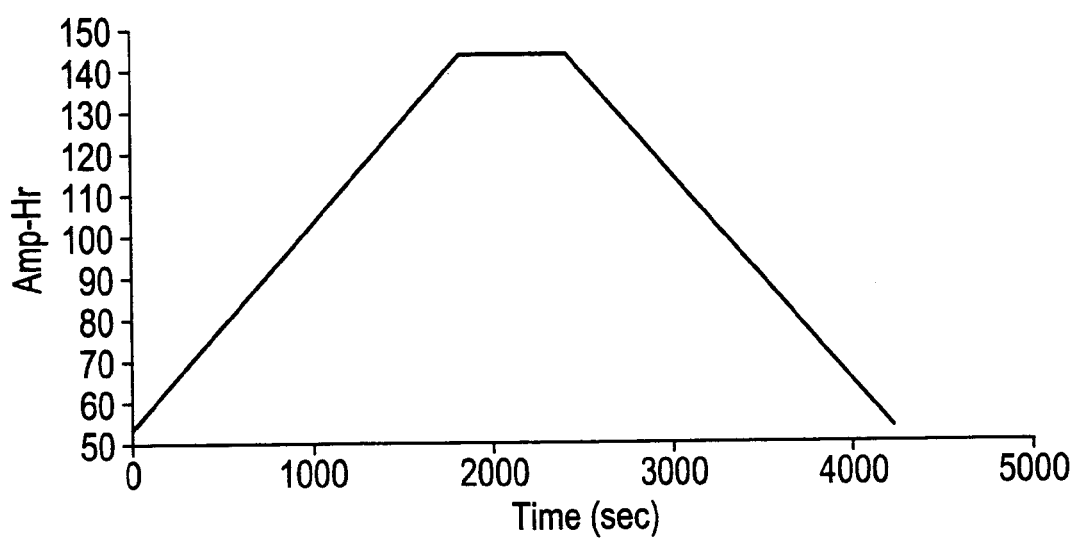

FIGS. 11–13 illustrate in greater detail exemplary initial battery characterization test methodologies (i.e., current and ampere-hour (Ah) test profiles) for the above discussed Tests 1, 2 and 3 on a battery having a capacity of 180 Ah. It should be appreciated, however, that the applicability of the test methodologies disclosed herein is not limited in any manner to specific battery sizes, capacities or configurations.

In particular, FIG. 11 illustrates an initial commissioning charge and full capacity test profile. As shown in the current versus time test profile 1102, a commissioning charge is implemented to bring the battery to a full state of charge; that is, to its rated ampere-hour capacity. To this end, the battery is supplied with a charging current of 36 amperes (A) over a duration of about 7 hours. It will be noted that the resulting charge actually exceeds the rated capacity of 180 Ahr by 40% (peaking at about 252 Ahr as shown in the charge versus time test profile 1104). Such an initial commissioning charge is in some cases recommended by the battery manufacturer. Following a "rest" period of about 1 hour, the battery is then fully discharged by 180 Ahr. More specifically, a current of about 180 A (the "C rate" current) is initially drawn from the battery, followed by a series of periodic, high current pulses. The current pulses are included to enable computation of the battery's internal resistance during this discharge test.

One way to implement measuring battery internal resistance throughout a DOD range of the battery is through a delta voltage/delta current technique, wherein the delta current is the C rate, or 180 A in the example presented herein. Additional resistance measurements may be computed during the transition to/from and from/to the C rate current and the maximum pulse current (as limited by the specific test power system and/or the specific HEV application).

Following the completion of Test 1, the battery is again recharged and partially discharged (Test 2), as shown in FIG. 12. From a completely discharged state, a charge current of 180 A is applied to the battery for about 0.8 hours (shown in the current versus time profile 1202) so as to charge the battery to 80% SOC or 20% DOD. This translates to a battery charge of about 144 Ahr, as shown in the charge versus time profile 1204 of FIG. 12. Then, after a rest period of about 10 minutes, a discharge current at the C rate (about 180 A) is initially drawn, followed by a series of periodic, high current pulses so as to again to enable computation of the battery's internal resistance during Test 2. The duration of the discharge period, including high current pulses, is slightly less than one half hour so as to decrease the battery capacity by 50% of its total capacity (i.e., by 90 Ahr, or from 20% DOD to 70% DOD).

FIG. 13 is a current/charge profile for the repeated charge/discharge of Test 3. As is the case with Test 2, Test 3 causes the battery to be operated over 50% of the total capacity. After the completion of Test 2, the battery is at 70% DOD, thus the 180 A of charging current in Test 3 is applied for a duration of one half hour (as shown in the current versus time profile 1302) to bring the battery back up to 20% DOD. After about 10 minutes, the battery is then discharged down to 70% DOD. Again, the high current pulses allow for internal resistance calculations over the DOD to be calculated. The determination of the lower cutoff voltage described earlier may be made either at (1) a high discharge spike of the discharge current or (2) the last portion of the C rate discharge current in profile 1304.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for resetting a state of charge (SOC) calculation for a designated energy storage bank of an energy storage system of a vehicle, the method comprising:
   during operation of the vehicle, completely discharging and completely charging the designated energy storage bank;
   maintaining the designated energy storage bank at a predetermined high terminal voltage for a specified period of time; and
   following said specified period of time, defining a calculated, reset SOC for the designated energy storage bank to be a known SOC capacity.

2. The method of claim 1, wherein said completely discharging the designated energy storage bank further comprises discharging energy from the designated energy storage bank to at least one of: one or more available energy storage banks in the energy storage system, a vehicle motoring operation, and a resistive grid.

3. The method of claim 2, wherein:
   said one or more available energy storage banks are a preferred discharging sink for the designated energy storage bank over said vehicle motoring operation and said resistive grid; and
   said vehicle motoring operation is a preferred discharging sink for the designated energy storage bank over said resistive grid.

4. The method of claim 1, wherein said completely charging the designated energy storage bank further comprises supplying charging energy to the designated energy storage bank from at least one of: one or more available energy storage banks in the energy storage system, a vehicle dynamic braking operation, and a combustion engine of the vehicle.

5. The method of claim 4, wherein:
   said one or more available energy storage banks are a preferred charging source for the designated energy storage bank over said vehicle dynamic braking operation and said combustion engine; and
   said vehicle dynamic braking operation is a preferred charging source for the designated energy storage bank over said combustion engine.

6. A method for controlling two or more energy storage banks in a vehicle energy storage system, the method comprising:
   determining a remaining life cycle for each of the energy storage banks; and
   allocating a total amount of commanded charging and discharging power commanded among each of the energy storage banks in accordance with said determined remaining life cycle thereof, wherein a flow of said power is prioritized in accordance with the two or more energy storage banks having the highest remaining life cycle.

7. The method of claim 6, further comprising:
   determining an initial participation factor for each of the energy storage banks, said initial participation factor representing the relative contribution of a given storage bank with respect to the remaining storage banks;
   wherein said initial participation factor for each energy storage bank is determined based upon at least one of: a power rating thereof, an energy rating thereof, a calculated state of charge (SOC) thereof, and stored energy information thereof.

8. The method of claim 7, further comprising:
   determining a remaining life cycle for each of the energy storage banks; and
   based on said determined remaining life cycle for each of the energy storage banks, generating an adjusted participation factor for one or more of the energy storage banks;
   wherein an initial participation factor for a first storage bank having a greater remaining life cycle is increased with respect to an initial participation factor for a second storage bank having a lesser remaining life cycle.

9. A method for characterizing and projecting remaining cycle life for vehicle storage battery, the method comprising:
   performing a series of initial battery characterization tests;
   wherein said series of initial battery characterization tests further comprises:
   a first test, said first test comprising an initial commissioning charge and capacity test;
   a second test, said second test comprising a full recharge and partial discharge test; and
   a third test, said third test comprising a partial charge and partial discharge test: wherein during the performance of said third test, if an output voltage of the storage battery drops to a first cut-off value, then said third test is aborted and said first test is repeated:
   performing a series of periodic battery tests during the operating life of the vehicle storage battery;
   comparing the results of said periodic battery tests with said initial battery characterization tests; and
   projecting a remaining cycle life for the vehicle storage battery.

10. The method of claim 9, further comprising adding water to the vehicle storage battery following completion of said first test, if the water level thereof is below a minimum defined level.

11. The method of claim 9, wherein during the performance of said third test, if an output voltage of the storage battery drops to a second cut-off value, then said third test is aborted and said first test is repeated.

12. The method of claim 11, wherein said first cut-off value is related to a determined level of discharge current spiking associated with said third test, and said second cut-off value is related to a final C rate discharge portion associated with said third test.

13. The method of claim 12, further comprising:
repeating said third test for a least a first number, N1 of iterations, wherein N1 represents a specified number of cycles between an initial commissioning charge and a scheduled maintenance of the storage battery; and
following at least N1 iterations of said third test, continuing subsequent iterations of said third test until a battery output quantity falls below a corresponding rated quantity of the storage battery, at which time a second number, N2 of total iterations is recorded.

14. The method of claim 13, wherein said rated quantity of the storage battery corresponds to one of: a percentage of rated power, and a percentage of rated energy.

15. The method of claim 14, wherein said series of periodic battery tests further comprises said first test, said second test and said third test.

* * * * *